(12) United States Patent
King

(10) Patent No.: US 7,674,153 B2
(45) Date of Patent: Mar. 9, 2010

(54) ANIMAL TRAINING DEVICE

(75) Inventor: Stephen Geoffrey King, Romford (GB)

(73) Assignee: Steven Geoffrey King, Romford, Essex (GB)

( * ) Notice: Subject to any disclaimer, the term of this patent is extended or adjusted under 35 U.S.C. 154(b) by 568 days.

(21) Appl. No.: 10/566,047

(22) PCT Filed: Nov. 16, 2004

(86) PCT No.: PCT/GB2004/004823

§ 371 (c)(1),
(2), (4) Date: Jan. 26, 2006

(87) PCT Pub. No.: WO2005/051076

PCT Pub. Date: Jun. 9, 2005

(65) Prior Publication Data

US 2008/0072842 A1    Mar. 27, 2008

(30) Foreign Application Priority Data

Nov. 21, 2003   (GB) .................................. 0327113.7

(51) Int. Cl.
*A63H 5/00* (2006.01)
(52) U.S. Cl. ...................... 446/415; 446/213; 446/421; 119/712; 119/719
(58) Field of Classification Search ................. 446/415, 446/213, 421; 119/712, 719
See application file for complete search history.

(56) References Cited

U.S. PATENT DOCUMENTS

| 777,043 | A |  | 12/1904 | McClean |
| 1,026,256 | A |  | 5/1912 | Conklin |
| 3,029,554 | A | * | 4/1962 | Mobley ....................... 446/204 |
| 3,902,272 | A | * | 9/1975 | Molenaar ...................... 446/415 |
| 5,712,452 | A | * | 1/1998 | Lin ............................ 181/0.5 |
| 5,724,919 | A | * | 3/1998 | Boyd et al. .................. 119/719 |
| 6,582,097 | B2 | * | 6/2003 | Chang ......................... 362/253 |
| 6,776,503 | B1 | * | 8/2004 | Chang ......................... 362/201 |
| D556,619 | S | * | 12/2007 | Markfelder ................ D10/116 |
| 2004/0118361 | A1 | * | 6/2004 | Mugford ..................... 119/712 |

FOREIGN PATENT DOCUMENTS

| DE | 297 20 524 | 1/1998 |
| EP | 0 930 605 A | 7/1999 |
| GB | 2 304 450 | 3/1997 |

\* cited by examiner

*Primary Examiner*—Nini Legesse
(74) *Attorney, Agent, or Firm*—Andrus, Sceales, Starke & Sawall, LLP

(57) ABSTRACT

An animal training device (10) having a housing (11), a sound-producing member, an actuator (15), and a whistle (21, 23). The sound-producing member is mounted within a central cavity (12) formed in the housing (11), and the actuator (15) is provided in an opening (14) in one face (13) of the housing (11). The actuator (15) is arranged to transfer to the sound-producing member a manual force applied to the actuator (15), thereby to produce a first audible signal. The whistle (21, 23) includes a resonance chamber (23) formed integrally in the other face (22) of the housing (11), and a mouthpiece (21) in communication with the resonance chamber (23). The whistle (21, 23) is adapted to produce a second audible signal upon a user blowing into the mouthpiece (21).

8 Claims, 3 Drawing Sheets

ANIMAL TRAINING DEVICE

CROSS-REFERENCE TO RELATED APPLICATIONS

This application is the U.S. national stage application of International Application PCT/GB2004/004823, filed Nov. 16, 2004, which international application was published on Jun. 9, 2005, as International Publication WO 2005/051076 in the English language. The International Application claims priority of Great Britain Patent Application 0327113.7, filed Nov. 21, 2003.

This invention relates to an animal training device. In particular, it relates to an animal training device adapted to produce two audibly distinct signals to convey different messages to an animal.

The present invention has been developed particularly for the training of pet dogs, and will therefore be described herein with particular emphasis on this use. It is believed however, that the present invention will be equally effective in the training of substantially all kinds of intelligent animals.

It should also be understood that the term "audible" as used herein refers to signals audible to the animal being trained, rather than the human user of the device. The term thus includes sounds beyond the normal range of human hearing, such as those produced by a high frequency dog whistle, as well as substantially all sounds falling within the frequency range normally audible by humans.

The field of animal training has in recent years seen a general shift away from traditional "corrective" methods (i.e. those in which the animal is reprimanded for exhibiting unwanted behaviour) towards more humane "positive reinforcement" methods (i.e. those in which the animal is rewarded for exhibiting desired behaviour). Such positive reinforcement methods have been found to be more effective than corrective methods—and are particularly suitable for general obedience training of pet dogs.

An increasingly popular positive reinforcement technique is known as "clicker training". This involves the use of an animal training device known as a "clicker" which, as its name suggests, is used to generate an audible clicking sound. By generating the clicking sound at appropriate times, the dog (or other animal to be trained) can quickly be taught to associate the sound with a pleasurable experience, such as being fed a treat, being petted, or receiving verbal praise. The dog soon comes to consider the clicking sound itself to be a reward, and by selectively clicking whenever desired behaviour is exhibited, the trainer can instantly communicate his approval to the dog.

In order for clicker training to be effective, it is vital that the click is produced almost instantaneously (or as close to instantaneous as is practicable) with the behaviour being rewarded. If there is an appreciable time delay between the rewardable behaviour and the click, the dog will most likely not associate the reward with its behaviour, and the lesson will be lost. Even a delay of a few seconds can be enough to negate the effectiveness of the training.

The most widely available clickers utilise a flexibly resilient metal strip, mounted within a plastics housing. The strip is generally supported at two locations along its length, with a resiliently deformable portion of the strip being defined between one of the supports and a free end of the strip. The housing typically has an opening on one face, through which the user inserts their thumb to depress the resiliently deformable portion of the metal strip, thereby causing it to flex. When the pressure from the user's thumb is discontinued, the strip springs back to its initial un-flexed state. An audible click is produced by the strip flexing and/or springing back to its initial state. Often a rapid double-click will be produced—one click on flexing of the strip, and one click on the strip returning to its initial state.

Such clickers have attained widespread popularity, probably due to the simplicity of their construction which makes them inexpensive to manufacture and simple to use. However, the simplicity of their construction also leads to at least two drawbacks:

Firstly, the flexible metal strip is usually supported within the housing such that the clicking sound can only be produced when one end of the strip is depressed, and the user must therefore align the clicker in the appropriate direction in order to position his or her thumb correctly to make the click. If the clicker is aligned incorrectly, no click is produced—and by the time the clicker has been re-aligned, an appreciable time will have elapsed since the rewardable behaviour, thus negating the effectiveness of the training.

And secondly, the application of a certain amount of force is required in order to overcome the strip's inherent resistive tension, so as to cause it to flex. Whilst the amount of force required is not excessive for most users, it can prove prohibitive where the user is an elderly, arthritic or disabled person. This is a serious drawback, particularly when one considers the growing number of people with various disabilities who are reliant on dogs for assistance.

The present invention seeks to overcome these drawbacks by providing a device capable of producing an audible signal whichever way the device is aligned, and wherein the audible signal may be produced with the application of only a minimal amount of force, thus enabling its use by elderly, arthritic and disabled persons.

When training a pet dog, by far the most important lesson to be taught is the "recall", i.e. instructing the dog to return to its owner. This is particularly important if the dog is to be allowed to roam freely during normal daily exercise, as the owner must be confident that the dog will return on the appropriate command. The recall signal must therefore be capable of being heard by the dog from some distance away, and for this reason a whistle is generally used.

As mentioned above, standard clickers are satisfactory for conveying a simple reward message ("good boy") to a dog—however, they are not suitable for conveying a recall message ("come here"), as the click cannot be heard over a large distance. The dog owner must therefore carry both a whistle and a clicker when exercising their dog. This is inconvenient as the owner has to remember to carry an additional item, whilst extra pocket space is also taken up. In addition, attempting to use the whistle and clicker in rapid succession—i.e. to recall the dog and then immediately to reward it—can be awkward, and can lead to an appreciable time delay between the dog's return and the production of the rewarding click, thus negating the effectiveness of the training.

The present invention also seeks to address the above-identified issue by providing an integrated unit, adapted to produce two audibly distinct sounds: one capable of acting as a recall signal, and the other capable of acting as a reward signal.

Therefore according to the present invention, there is provided an animal training device comprising:

a housing having a central cavity formed therewithin;

a sound-producing member mounted within said cavity and adapted to produce a first audible signal upon the application of force to said sound-producing member;

an actuator provided on one face of said housing, and adapted to transfer to the sound-producing member a manual force applied to said actuator; and a whistle comprising a resonance chamber formed integrally in the other face of said housing, and a mouthpiece in communication with said whistle resonance chamber, said whistle being adapted to produce a second audible signal upon a user blowing into the mouthpiece.

In order that the device of the present invention may serve its purpose as a combined recall and reward signal generator, it is important that the first and second audible signals are audibly distinct. The first audible signal is thus generated as a click, whilst the second audible signal is generated as a whistle sound.

The sound-producing member is preferably a flexibly resilient metal strip adapted to produce a clicking sound upon the application of a manual force, as described above with reference to the prior art. The metal strip is mounted within the housing, and supported at two locations along its length. A resiliently deformable portion of the strip is defined, either between one of said two support locations and a free end of the strip, or between the said two support locations.

The actuator comprises an actuating member, arranged to bear against the resiliently deformable portion, so as in use to transfer an applied manual force from the actuator to the resiliently deformable portion of the metal strip. Most preferably, the actuator further comprises a manually-operable button adapted to receive the application of a manual force from a user's thumb.

The actuator may preferably be mounted in the housing for hinged movement about a pivot, and arranged such that the application of a manual force to the button will generate a click, no matter in which direction the device is aligned.

The actuator will desirably be engineered such that only a minimal applied force is required in order to generate the first audible signal. This may be achieved by balancing the pivot mechanism of the actuator with respect to the resistive tension in the metal strip. This ensures that the first audible signal may be easily produced by elderly, arthritic or disabled users. The balanced mechanism also ensures that the first audible signal is produced at precisely the intended time, i.e. without any appreciable delay or anticipation.

In certain embodiments of the present invention, the actuator mechanism may be adjusted so as either to increase or decrease the volume of the generated click. Increased volume may be required, for example, where the device is to be used for the training of an animal which is hard of hearing. Conversely, decreased volume may be required, for example, where the device is to be used for the training of an animal which is particularly sensitive to sound.

In order that the device may be quickly and easily accessible for use when exercising a pet dog (or other animal) in the open, the device preferably further comprises attachment means for attaching the device to a chain, cord, key ring, wrist-band, or similar. In preferred embodiments of the device, a chain, cord, key ring, wrist-band, or similar, may be provided with the device.

The housing, which may conveniently be formed from moulded plastics material, is preferably shaped and sized so as in use to fit comfortably in the palm of a user's hand. This also enables a user to generate the first and second audible signals simultaneously, should this be desired.

In order that the present invention may be more fully understood, preferred embodiments thereof will now be described in detail, though only by way of example, with reference to the accompanying drawings, in which.

Figure 1:
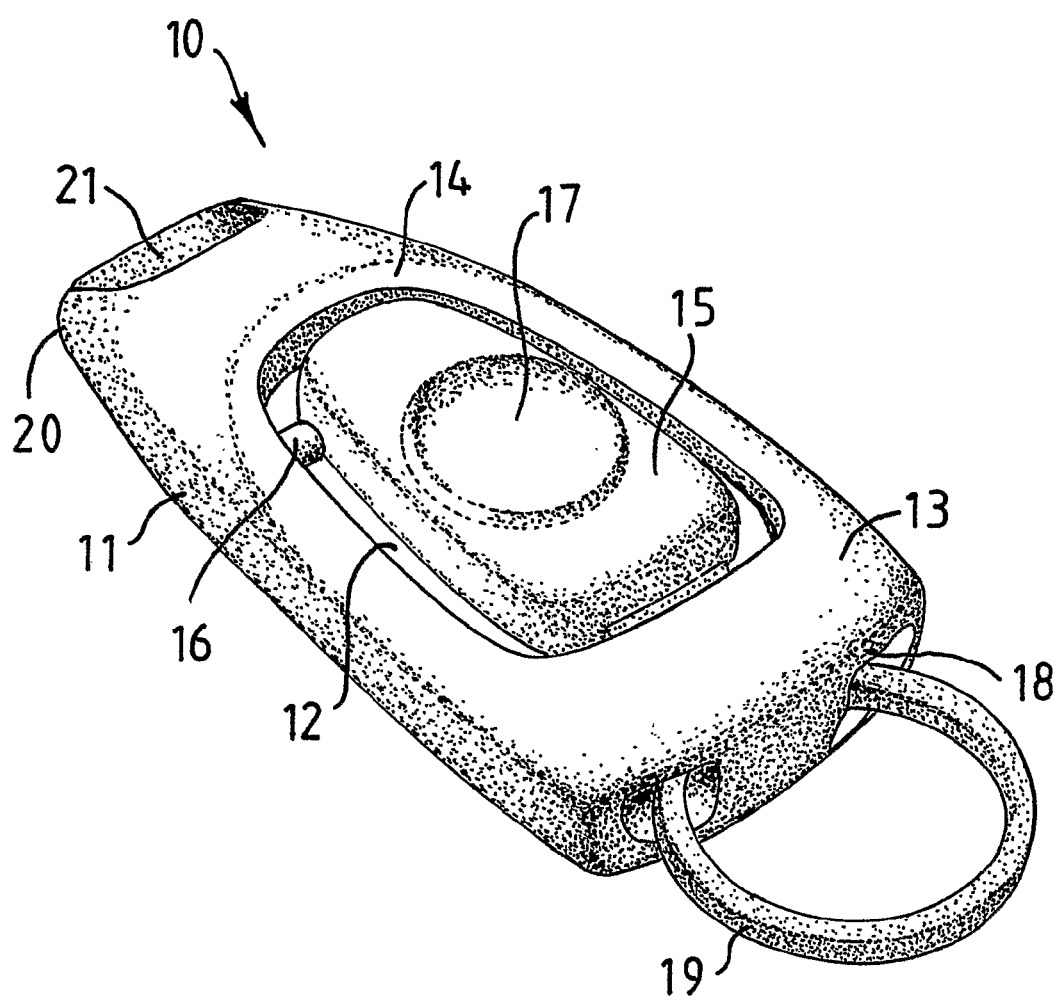
FIG. 1 shows a perspective view of one face of a preferred embodiment of animal training device according to the present invention.

Referring first to FIG. 1, there is shown an animal training device, generally indicated 10, having a moulded plastics housing 11. The housing 11 has a central cavity 12, within which is mounted a flexibly resilient metal strip 43 arranged to generate a clicking sound upon the application of force to a resiliently deformable portion thereof.

A first face 13 of the housing 11 has an opening 14 in communication with the central cavity 12. An actuator 15 is mounted in the opening 14 for hinged movement about a pivot 16. The actuator 15 is formed with a button portion 17 adapted to receive the application of a manual force. As will be described subsequently, in use the actuator 15 transfers the applied force from the button 17 to the metal strip 43.

Figure 2:
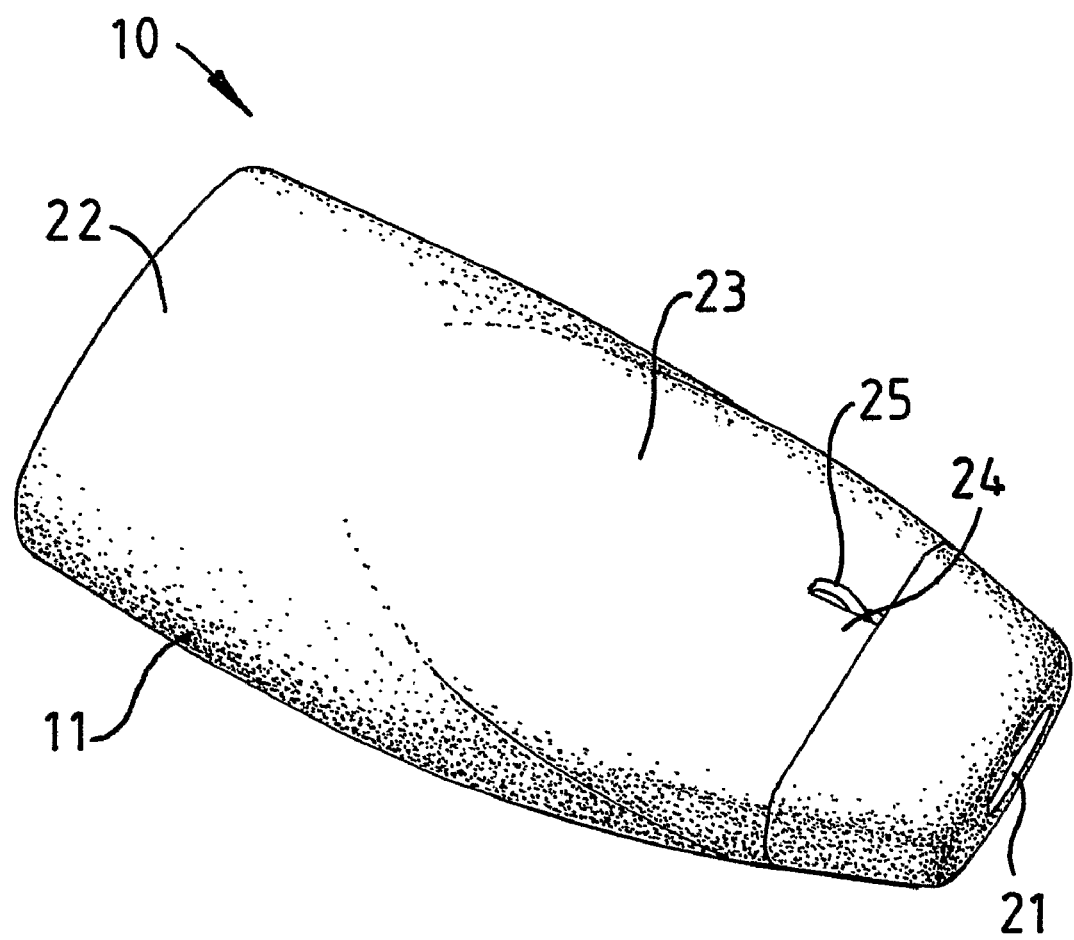
FIG. 2 shows a perspective view of the other face of the device of FIG. 1.
Figure 3:
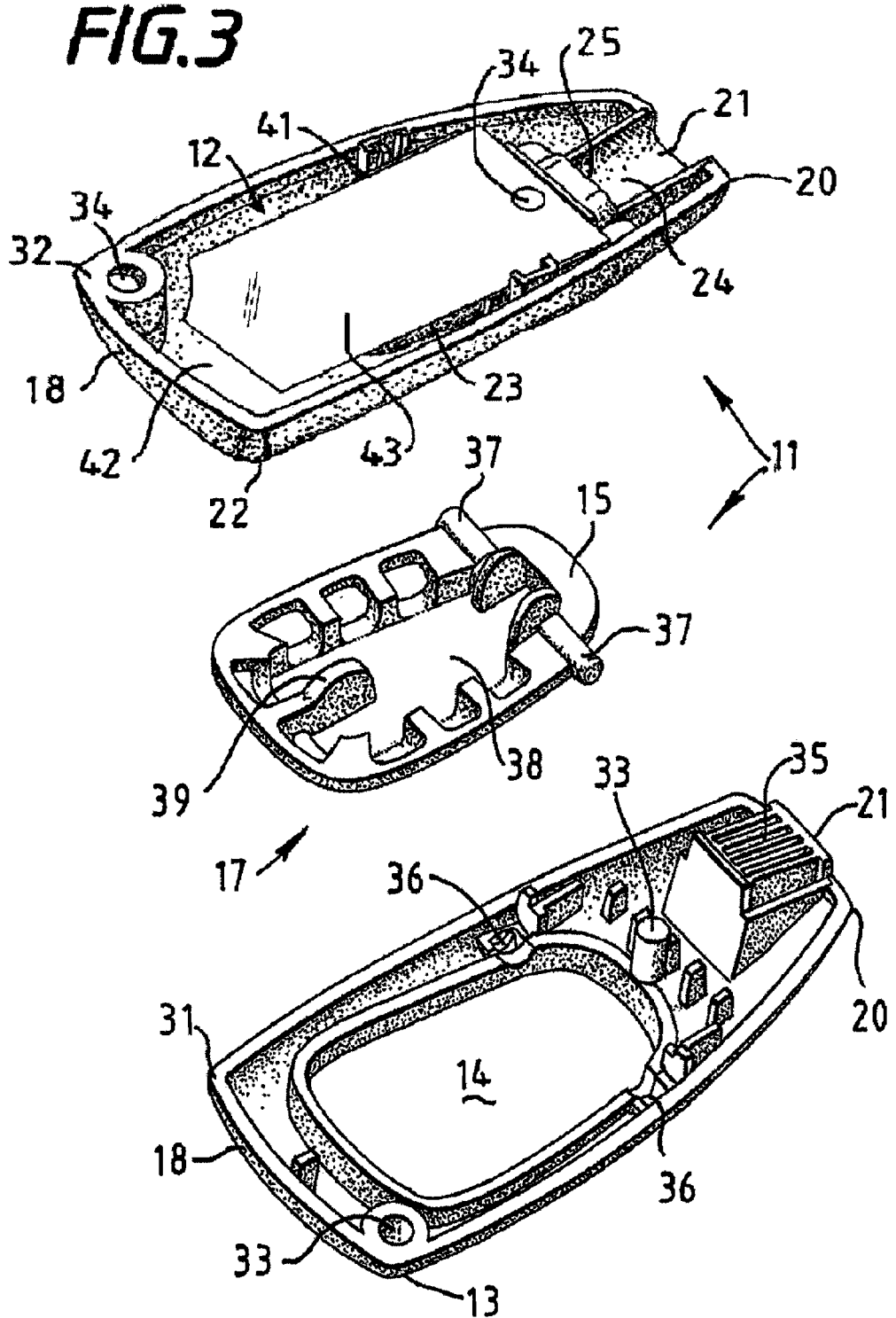
FIG. 3 shows an exploded perspective view of the various component parts of the device of FIGS. 1 and 2.

The housing 11 is also provided at one end 18 thereof with a ring 19 to enable attachment of the device 10 to a chain, cord, key ring, wrist band or the like (note: the ring 19 is an optional component and hence is not shown in FIGS. 2 and 3). At the other end 20 of the housing 11 is formed a mouthpiece 21 for a whistle, as will be now be explained with reference to FIG. 2.

As can be seen from FIG. 2, a second face 22 of the housing 11 is formed with a resonance chamber 23 as an integral part thereof—though it is to be noted that the resonance chamber 23 is isolated from the central cavity 12 of the housing 11. The resonance chamber 23 communicates with the mouthpiece 21 via a channel 24 having a whistle slot 25 formed therein. The device 10 can thus be used as a standard whistle. The various component parts 21, 23, 24, 25, which constitute the whistle may be configured either to produce a sound audible to both the human user and the animal to be trained, or to produce a sound audible only to the animal.

As can best be seen from FIG. 3, the housing 11 may conveniently be formed from first and second halves 31, 32, corresponding to the first and second faces 13, 22 of the housing 11. In order to show the internal components of the device 10 in FIG. 3, the first and second halves 31, 32 are each shown with their respective housing faces 13, 22 oriented downwards, and the faces 13, 22 are therefore not visible. To assemble the housing 11 from the positions of the halves 31, 32 as shown in FIG. 3, the second half 32 must be rotated through 180° before bringing it into alignment with the first half 31. To this end, the first half 31 is provided with two upstanding pegs 33, whilst the second half 32 has two complementary sockets 34, adapted to receive the pegs 33.

The first half 31 of the housing has a guide portion 35 which, when the housing 11 is assembled forms one side of the channel 24 and acts to guide air onto the whistle slot 25 adjacent the entrance to the resonance chamber 23.

The first half 31 is also provided with two cradle members 36, each adapted to receive a complementary lug 37 of the actuator 15 therein. When the device 10 is assembled, the actuator 15 is thus mounted for hinged movement about a pivot axis 16 co-incident with the lugs 37. The actuator 15 pivots relative to the housing 11, within the opening 14. This movement is effected by the user pressing the actuator button 17 (not visible in FIG. 3). On the face 38 of the actuator 15 opposite the button 17, is formed an actuating member 39 which, when the device 10 is assembled, is arranged to bear against the resiliently deformable portion of a flexibly resilient metal strip 43.

The second half 32 of the housing 11 has a first support point 41 for the metal strip 43, with a second support point 42 being provided by the housing half 11, 32 itself, adjacent the first end 18 thereof. A resiliently deformable portion of the metal strip 43 is thus defined between said first and second support points 41, 42.

A typical use of the animal training device 10 according to the present invention will now be described with reference simultaneously to all of FIGS. 1 to 3. This use involves the recalling and rewarding of a dog which, it is to be assumed, has previously been conditioned to understand the meaning of the recall (whistle) signal and the reward (click) signal.

To recall a dog (not shown) from some distance away, a dog owner (not shown) blows into the whistle mouthpiece 21 which, by virtue of the other whistle-forming components 23, 24, 25, 35, produces a high-frequency audible signal (whistle sound). The dog recognises the whistle sound as a recall signal and returns to its owner.

Just as the dog reaches its owner, the owner applies a small manual force to the actuator button 17 and then quickly discontinues the applied force. This causes the actuator 15 to rotate about its pivot 16, thus bringing the actuating member 39 to bear upon the deformable portion of the metal strip 43, thus transferring the applied force to the strip 43. The strip 43 is caused to flex briefly, before springing back to its initial state due to its inherent resistive tension. This produces a low-frequency audible signal consisting of two closely-separated individual signals (double clicking sound), each said individual signal corresponding to the flexing and subsequent release of the metal strip 43.

The dog is easily able to distinguish the clicking sound from the previous whistle sound, and recognises the clicking sound as a reward signal. The dog associates the instantaneous reward with the action of returning to its owner, and understands that it is being rewarded for this action. This produces a positive reinforcement effect, in that the dog becomes even more likely to respond to the recall signal in future.

In addition to the use described above, the device 10 according to the present invention may of course be used as a standard whistle only or as a standard clicker only.

The invention claimed is:

1. An animal training device comprising:
   a housing having first and second faces, and a central cavity;
   a flexibly resilient metal strip mounted in the cavity, such that said metal strip is supported at two locations along its length, and comprises a resiliently deformable portion, wherein upon the application of a force to said strip, the strip is caused to flex briefly, before springing back to its initial state due to its inherent resistive tension to produce two audible signals, each said signal corresponding to the flexing and subsequent release of the metal strip;
   an actuator provided on the first face of the housing, said actuator being arranged to bear against the resiliently deformable portion of the metal strip thereby to transfer to said portion a manual force applied to said actuator; and
   a whistle comprising a resonance chamber formed in the second face of the housing, and a mouthpiece in communication with said whistle resonance chamber, said whistle being adapted to produce an audible signal upon a user blowing into said mouthpiece.

2. The animal training device of claim 1, wherein the resiliently deformable portion of the metal strip is defined between said two support locations.

3. The animal training device of claim 1, wherein said metal strip has a free end, and wherein the resiliently deformable portion of the metal strip is defined between one of said two support locations and said free end of the strip.

4. The animal training device of claim 1, wherein the actuator further comprises a manually-operable button, located on an outer surface of said actuator, said button being adapted to receive the application of a manual force from a user's thumb.

5. The animal training device of claim 1, wherein the actuator is mounted in the housing on a pivot, such that said actuator is capable of hinged movement about said pivot.

6. The animal training device of claim 1, further comprising attachment means to attach said device to a further component selected from a chain, a cord, a key ring and a wristband.

7. The animal training device of claim 1, wherein the housing is formed from molded plastics material.

8. The animal training device of claim 1, wherein the housing is of complementary shape and size to a palm of a user's hand.

* * * * *